(12) United States Patent
Matsuura

(10) Patent No.: US 11,120,579 B2
(45) Date of Patent: Sep. 14, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takahiro Matsuura, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 16/508,893

(22) Filed: Jul. 11, 2019

(65) Prior Publication Data
US 2020/0034991 A1     Jan. 30, 2020

(30) Foreign Application Priority Data

Jul. 25, 2018 (JP) .............................. JP2018-139580

(51) Int. Cl.
| G06K 9/00 | (2006.01) |
| H04N 3/14 | (2006.01) |
| G06T 7/90 | (2017.01) |
| G06T 5/20 | (2006.01) |
| G06T 5/00 | (2006.01) |
| G06T 7/00 | (2017.01) |

(52) U.S. Cl.
CPC ................ *G06T 7/90* (2017.01); *G06T 5/002* (2013.01); *G06T 5/20* (2013.01); *G06T 7/0002* (2013.01); *G06T 2207/20092* (2013.01)

(58) Field of Classification Search
USPC ....... 382/103, 100, 112, 154, 162, 168, 173, 382/181, 189, 199, 232, 254–260, 274, 382/276, 286–291, 305, 321, 261, 264; 348/349, 272, 273; 345/593
See application file for complete search history.

(56) References Cited

U.S. PATENT DOCUMENTS

| 2005/0063585 | A1* | 3/2005 | Matsuura | ................. | G06K 9/00 |
| | | | | | 382/162 |
| 2012/0032973 | A1* | 2/2012 | Sano | ....................... | G01J 3/504 |
| | | | | | 345/593 |
| 2014/0064633 | A1* | 3/2014 | Taya | ....................... | G06T 5/001 |
| | | | | | 382/261 |
| 2015/0207984 | A1* | 7/2015 | Hamano | .......... | H04N 5/232123 |
| | | | | | 348/349 |
| 2016/0080634 | A1* | 3/2016 | Hamano | .......... | H04N 5/232123 |
| | | | | | 348/349 |

FOREIGN PATENT DOCUMENTS

JP    2016-164559 A    9/2016

* cited by examiner

*Primary Examiner* — Seyed H Azarian
(74) *Attorney, Agent, or Firm* — Canon U.S.A., Inc. IP Division

(57) ABSTRACT

An image processing apparatus includes an acquisition unit configured to acquire a captured image obtained by imaging an imaging target using an imaging device, a generation unit configured to generate a display image to be displayed on a display unit, based on the captured image, a control unit configured to cause the display unit to display the display image, a specification unit configured to specify an evaluation area on the display image based on an instruction from a user, and a calculation unit configured to calculate an evaluation value in the evaluation area on the display image. The generation unit executes a filter process on the captured image and generates the display image.

19 Claims, 8 Drawing Sheets

IMAGE PROCESSING APPARATUS, IMAGE PROCESSING METHOD, AND STORAGE MEDIUM

BACKGROUND

Field of the Disclosure

The present disclosure generally relates to image processing and, more particularly, to an image processing apparatus, an image processing method, a storage medium, and an image process for evaluating a color of an object.

Description of the Related Art

Conventionally, a technique that evaluates a color of an imaging target using a captured image acquired from a digital camera has been known. Japanese Patent Application Laid-Open No. 2016-164559 discusses a technique that compares chromaticity distribution of an inspection object acquired by imaging with chromaticity distribution of a criterion object and inspects a difference in color texture (color distribution).

In a case where an object is imaged and a color of the object is evaluated, the color obtained by the imaging varies depending on a shape of the object and an imaging condition. In the conventional color evaluation technique discussed in Japanese Patent Application Laid-Open No. 2016-164559, however, resolution control based on a human sense of sight is not made, and thus a subtle difference in color texture visually unrecognized is reproduced. This results in a difference between the reproduced color texture and one visually recognized.

SUMMARY

The present disclosure is directed to a process for evaluating a color close to a color recognized by human eyes.

According to one or more aspects of the present disclosure, an image processing apparatus includes an acquisition unit configured to acquire a captured image obtained by imaging an imaging target using an imaging device, a generation unit configured to generate a display image to be displayed on a display unit, based on the captured image, a control unit configured to cause the display unit to display the display image, a specification unit configured to specify an evaluation area on the display image based on an instruction from a user, and a calculation unit configured to calculate an evaluation value in the evaluation area on the display image. The generation unit executes a filter process on the captured image and generates the display image.

Further features of the present disclosure will become apparent from the following description of exemplary embodiments with reference to the attached drawings.

DESCRIPTION OF THE EMBODIMENT

Various exemplary embodiments, features, and aspects of the present disclosure will be described below with reference to the drawings. The following exemplary embodiments do not limit the present disclosure. Every combination of features described in the present exemplary embodiments are not essential for the present disclosure.

<Configuration of Color Evaluation System>

Figure 1:
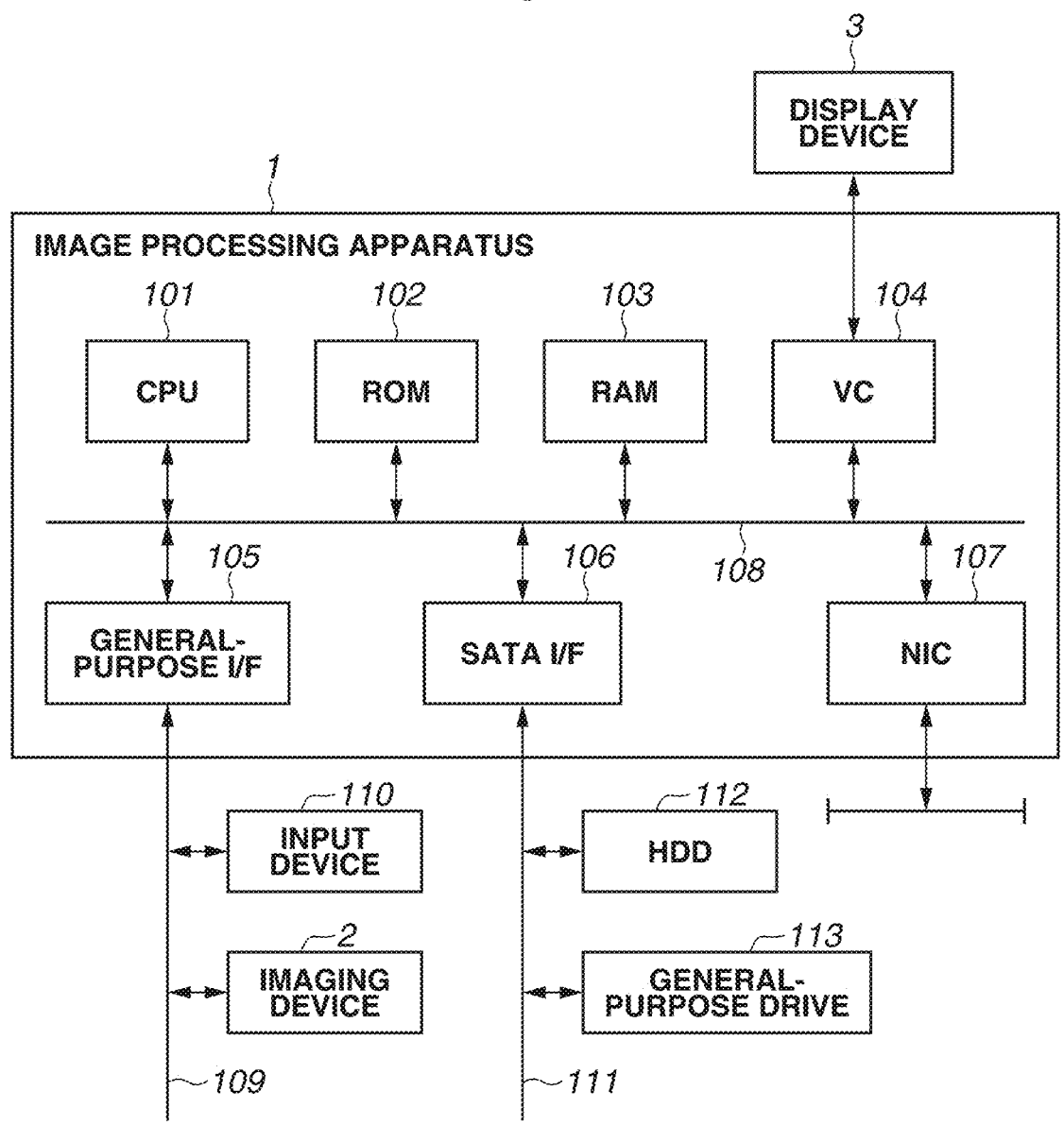
FIG. 1 is a diagram illustrating a hardware configuration.

FIG. 1 is a block diagram illustrating a hardware configuration of an image processing apparatus 1, an imaging device 2, and a display device 3. The image processing apparatus 1 includes a central processing unit (CPU) 101, a read only memory (ROM) 102, and a random access memory (RAM) 103. The image processing apparatus 1 further includes a video card (VC) 104, a general-purpose interface (I/F) 105, a serial advanced technology attachment (SATA)I/F 106, and a network interface card (NIC) 107.

The CPU 101, which may include one or more processors, circuitry, or the like, may use one or more memories including the RAM 103 as a work memory and execute an operating system (OS) and various programs stored in the ROM 102, a hard disk drive (HDD) 112 or the like. The CPU 101 further controls the respective configurations via a system bus 108. Program codes stored in the ROM 102 or the HDD 112 are developed in the RAM 103, and processes in the flowcharts, described below, are executed by the CPU 101. The VC 104 is connected to the display device 3. The general-purpose I/F 105 is connected to an input device 110, such as a mouse and a keyboard, and the imaging device 2 via a serial bus 109. The SATA I/F 106 is connected to the HDD 112 and a general-purpose drive 113 which performs reading and writing of various recording media via a serial bus 111. The NIC 107 inputs and outputs information from and to an external device. The CPU 101 uses the various recording media, which are mounted to the HDD 112 and the general-purpose drive 113, as storage locations for various data. The CPU 101 displays a user interface (UI), which is provided by the programs, on the display device 3, and receives inputs such as user instructions to be accepted via the input device 110.

<Functional Configuration of Image Processing Apparatus 1>

Figure 2:
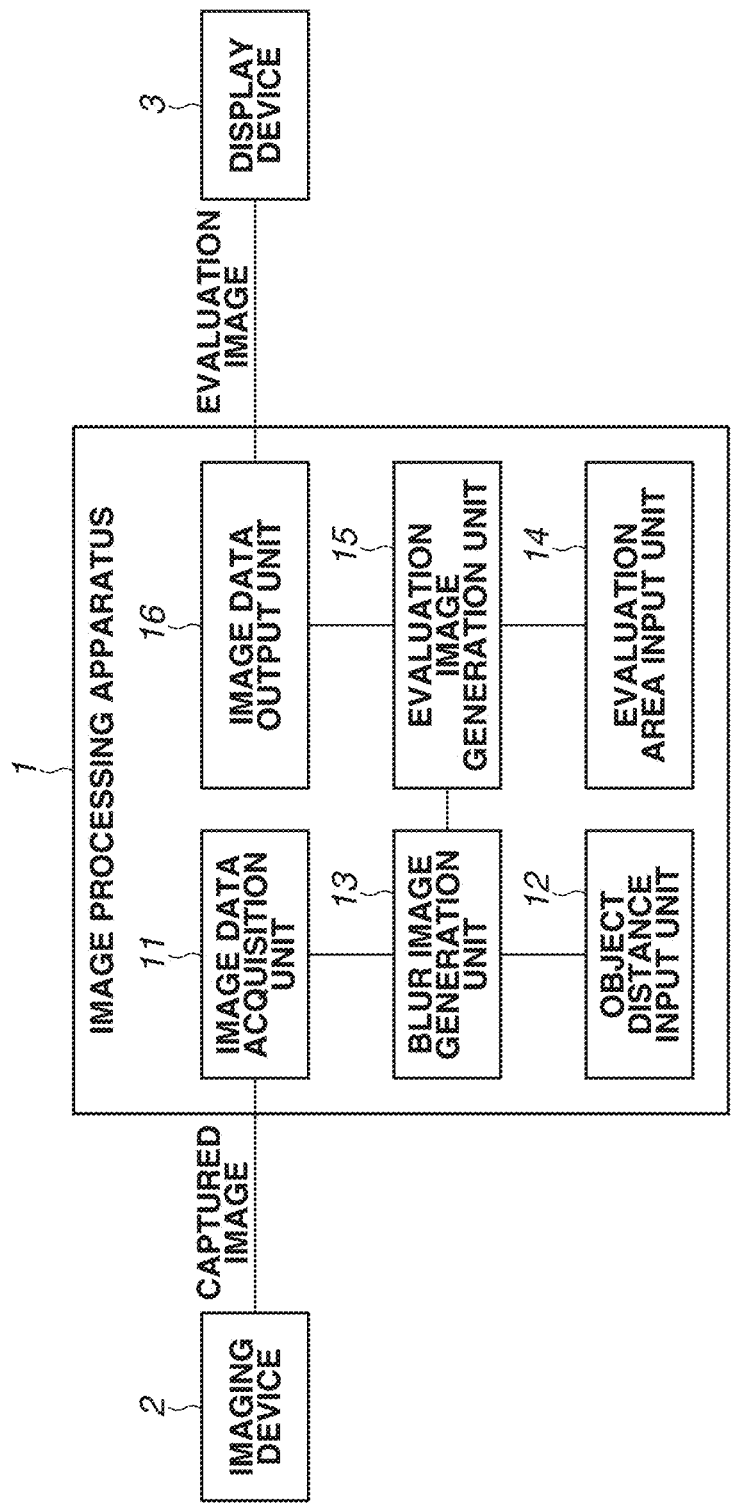
FIG. 2 is a block diagram illustrating a functional configuration.

FIG. 2 is a diagram illustrating a functional configuration of the image processing apparatus 1 according to the present embodiment. The image processing apparatus 1 includes an image data acquisition unit 11, an object distance input unit 12, a blur image generation unit 13, an evaluation area input unit 14, an evaluation image generation unit 15, and an image data output unit 16.

The image data acquisition unit 11 acquires captured image data obtained by the imaging device 2. Alternatively, the image data acquisition unit 11 acquires captured image data stored in the HDD 112 in advance from the HDD 112. The image data acquisition unit 11 further acquires information representing characteristics of a sensor of the imaging device 2 and information representing optical characteristics of the imaging device 2. The information representing the characteristics of the sensor of the imaging device 2 is information representing a size and a pixel count of the sensor of the imaging device 2. The information representing the optical characteristics of the imaging device 2 is information representing a focal length of a lens of the imaging device 2. The object distance input unit 12 inputs information representing a distance from the imaging device 2 to an imaging target.

The blur image generation unit 13 corrects the captured image based on the various information and generates blur image data representing a blur image. The various information includes the information representing the distance from the imaging device 2 to the imaging target, the information representing the characteristics of the sensor of the imaging device 2, the information representing the optical characteristics of the imaging device 2, and information representing a contrast response of human visual characteristics.

The evaluation area input unit 14 accepts an input from a user and specifies an evaluation area and a reference position on the blur image.

The evaluation image generation unit 15 generates evaluation image data representing an evaluation image based on the specified evaluation area and the reference position.

The image data output unit 16 outputs the evaluation image data generated by the evaluation image generation unit 15 to the display device 3 via the VC 104.

The display device 3 displays the evaluation image data representing the evaluation image. The user checks the displayed evaluation image data and evaluates the captured image.

<Process to be Executed by Image Processing Apparatus 1>

Figure 3:
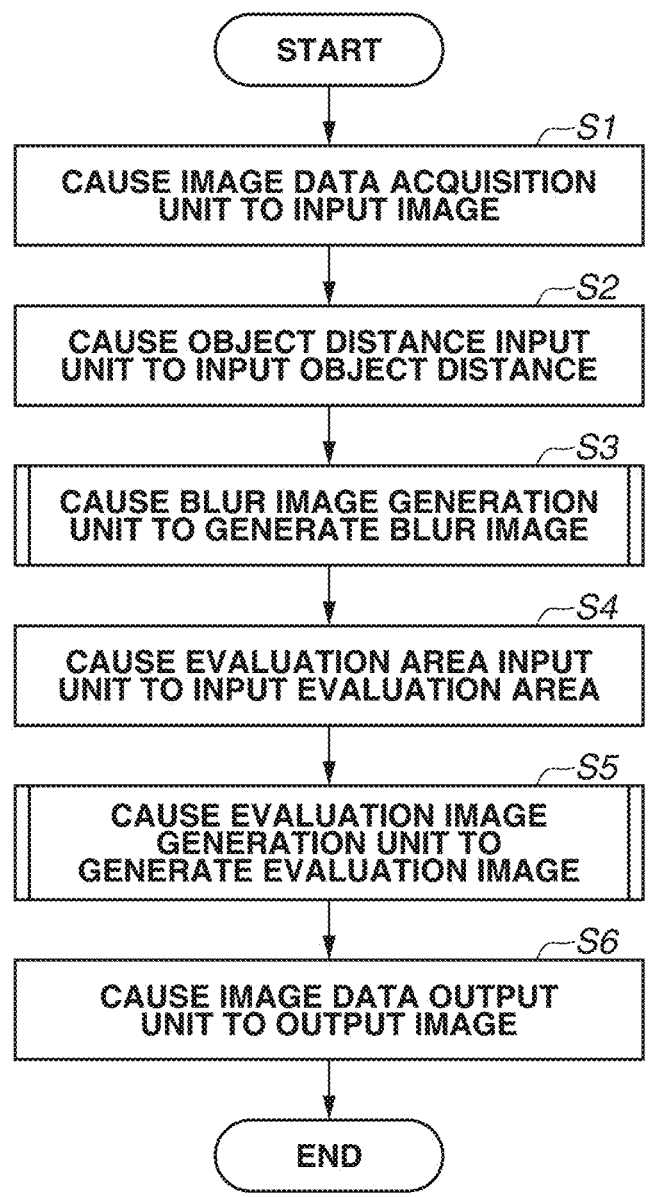
FIG. 3 is a flowchart illustrating a process of an image processing apparatus.

FIG. 3 is a flowchart illustrating a process to be executed by the image processing apparatus 1. Hereinafter, respective steps are indicated by numbers and S given before the numbers.

In step S1, the image data acquisition unit 11 acquires the captured image data acquired by an image capturing operation performed by the imaging device 2. Alternatively, the image data acquisition unit 11 acquires the captured image data stored in the HDD 112 in advance from the HDD 112. In step S1, the image data acquisition unit 11 further acquires information representing characteristics of the sensor of the imaging device 2 and information representing optical characteristics of the imaging device 2.

In step S2, the object distance input unit 12 inputs information representing the distance from the imaging device 2 to an imaging target.

In step S3, the blur image generation unit 13 corrects the captured image based on the various information and generates blur image data representing a blur image. The various information includes the information representing the distance from the imaging device 2 to the imaging target, the information representing the characteristics of the sensor of the imaging device 2, the information representing the optical characteristics of the imaging device 2, and the information representing a contrast response of human visual characteristics to be described blow. Details of a method for generating the blur image will be described below.

In step S4, the evaluation area input unit 14 accepts an input from a user and specifies an evaluation area and a reference position on the blur image. Details of the specifying method will be described below.

In step S5, the evaluation image generation unit 15 generates evaluation image data representing an evaluation image based on the specified evaluation area and the reference position. Details of the evaluation image generating method will be described below.

In step S6, the image data output unit 16 outputs the evaluation image data, which has been generated by the evaluation image generation unit 15, to the display device 3 via the VC 104.

<Process in Step S3>

Figure 4:
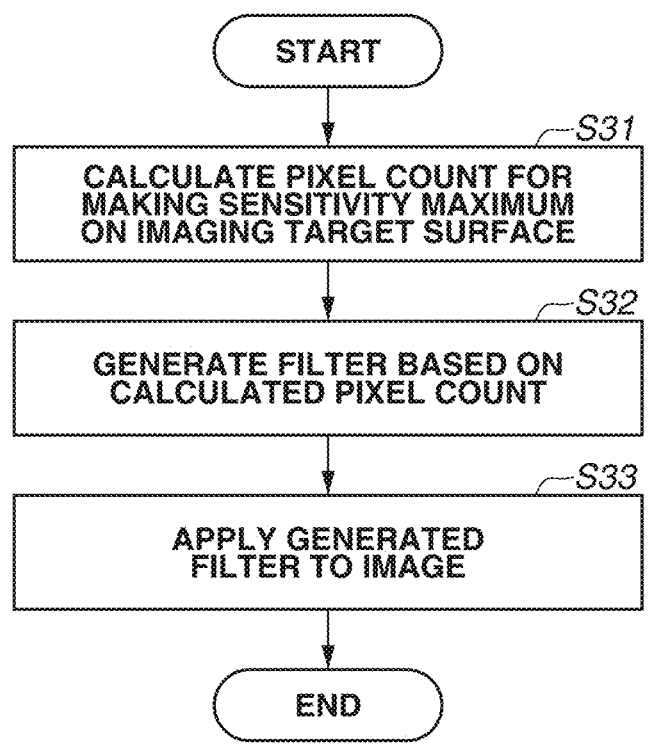
FIG. 4 is a flowchart illustrating a process for generating a blur image.

FIG. 4 is a flowchart illustrating a blur image generating process to be executed by the blur image generation unit 13.

Figure 5:
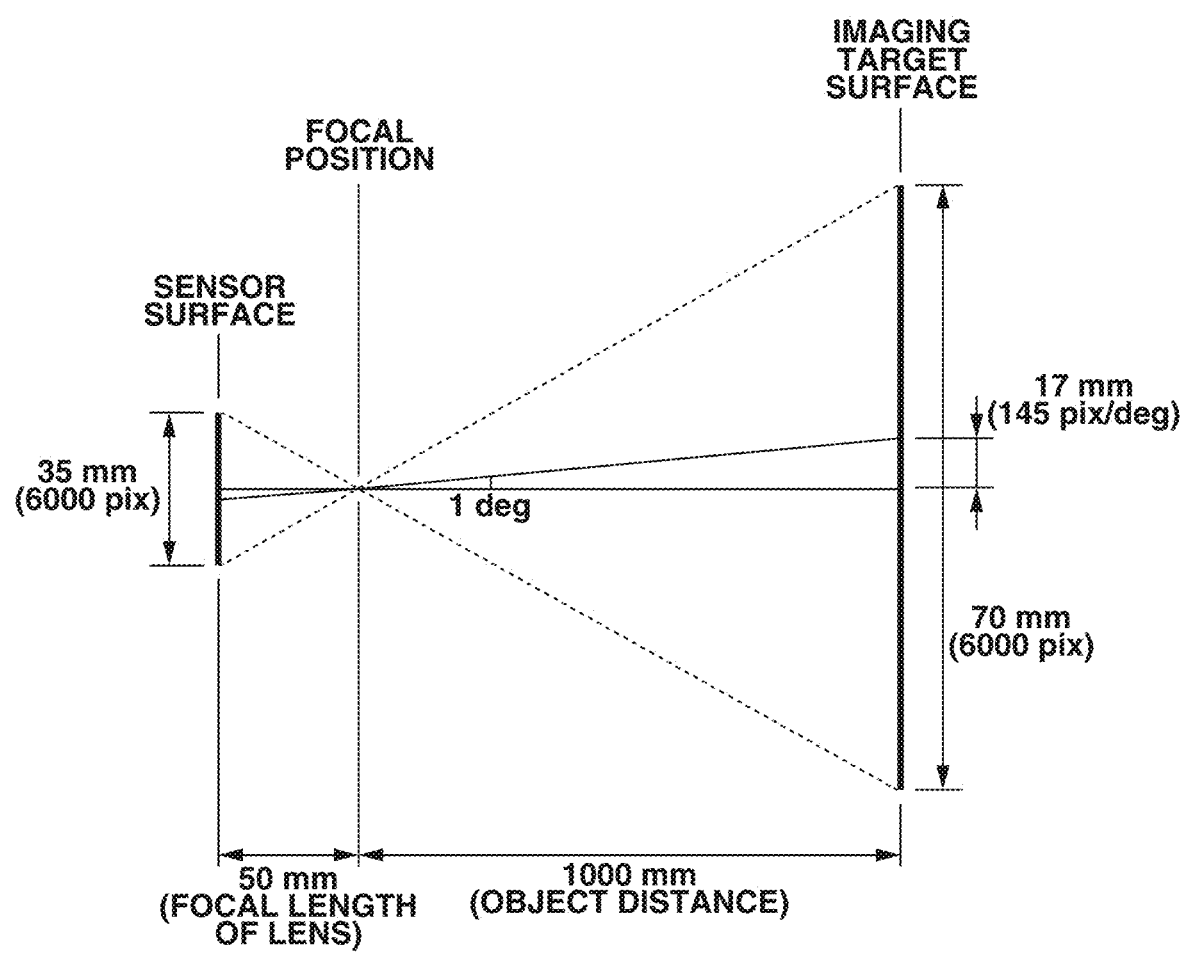
FIG. 5 is a diagram illustrating a method for calculating a blur amount.

In step S31, the blur image generation unit 13 calculates a pixel count for making sensitivity maximum on an imaging target surface. FIG. 5 is a diagram illustrating an example of calculating the pixel count. As to human visual characteristics, a response to a wave of 5 cycle/degree (cyc/deg) (a contrast response) provides maximum sensitivity (best clearness), and responses to waves of 5 or more cyc/deg deteriorate the sensitivity (result in blur and deteriorate the contrast responses). In the present exemplary embodiment, in order to achieve image processing in which the human visual contrast response is taken into account, calculation is made what pixel count of the captured image corresponds to 1 cyc of the wave of 5 cyc/deg.

For example, a size of the sensor of the imaging device 2 is set to 35 mm and the pixel count is set to 6000 pixels (pix), and an imaging target at a distance from the imaging device 2 by 1000 mm is imaged using a 50 mm lens. In this case, an imaging range h of an imaging target surface is calculated by the following equation.

$$h = 35 \times 1000 \div 50 = 700 \text{ [mm]} \quad (1)$$

The range of 700 mm is imaged at 6000 pix.

In a case where the imaging target at a position apart from the imaging device 2 by 1000 mm is viewed with a visual field of 1 deg, a size s corresponding to 1 deg is calculated by the following equation.

$$s = \arctan(1 \text{ deg}) \times 1000 = 17 \text{ [mm]} \quad (2)$$

A pixel count p corresponding to this range is calculated by the following equation.

$$p = 6000 \div 700 \times 17 = 145 \text{ [pix]} \quad (3)$$

The best human visual contrast response is 5 cyc, and thus the pixel count for 1 cyc is about 29 pix. That is, the pixel count for making the sensitivity highest for human beings is 29 pix, and thus pixel counts which are larger than 29 pix result in blur.

Figure 6:
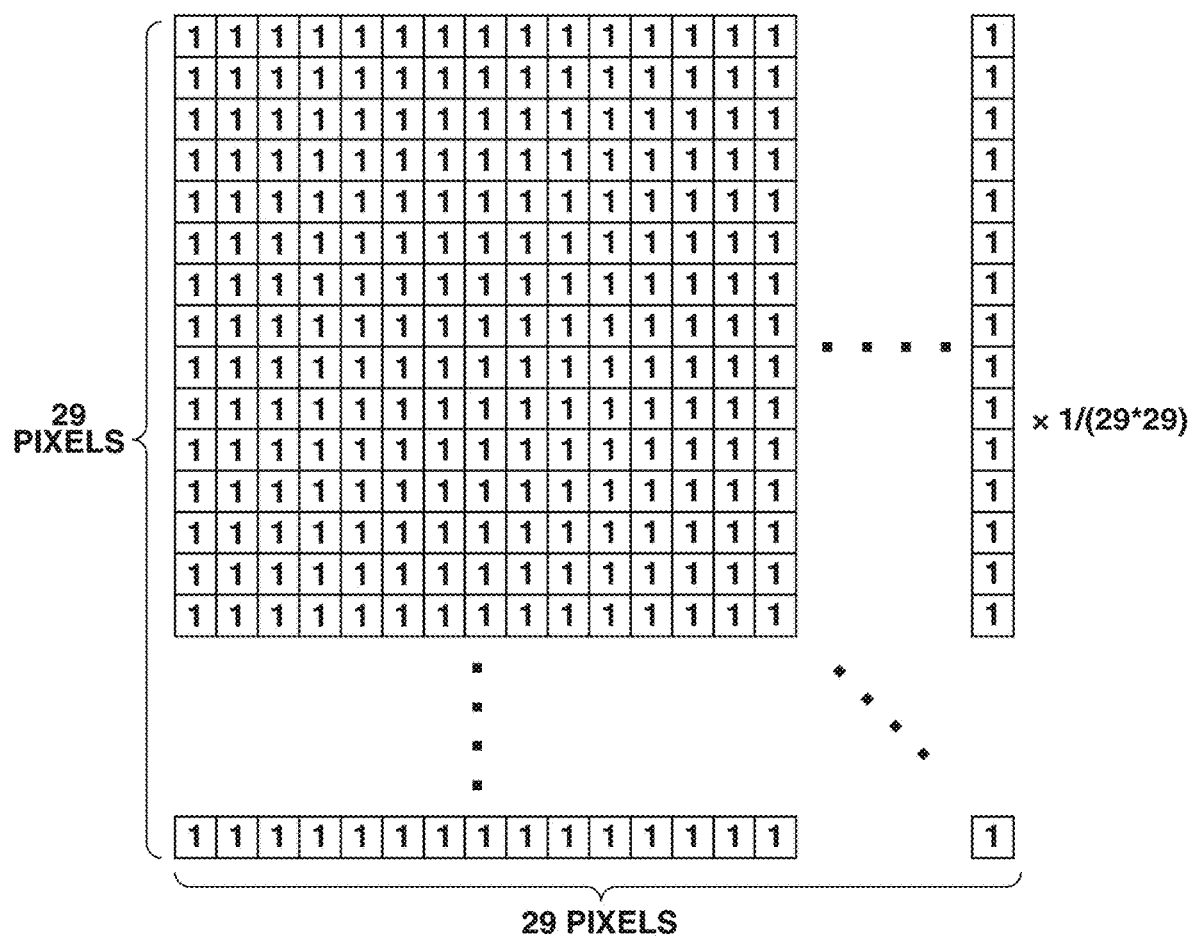
FIG. 6 is a diagram illustrating an example of a filter corresponding to a blur amount.

In step S32, the blur image generation unit 13 generates a low-pass filter (LPF) based on the calculated pixel count. FIG. 6 illustrates an example of the generated filter. For example, in a case where the pixel count is calculated as 29, as illustrated in FIG. 6, the blur image generation unit 13 generates a LPF (a filter for calculating a weighted average or an average filter) of 29×29.

In step S33, the generated filter is applied to a captured image. For example, in a case where an original image is a red, green, blue (RGB) image, the blur image generation unit 13 converts the RGB image into the Commission internationale de l'éclairage (CIE) l*a*b* (LAB) based on a formula defined by CIE RGB, and applies the filter only to the value L. The blur image generation unit 13 returns the converted image to the RGB image through inverse conversion.

<Process in Step S4>

Figure 7:
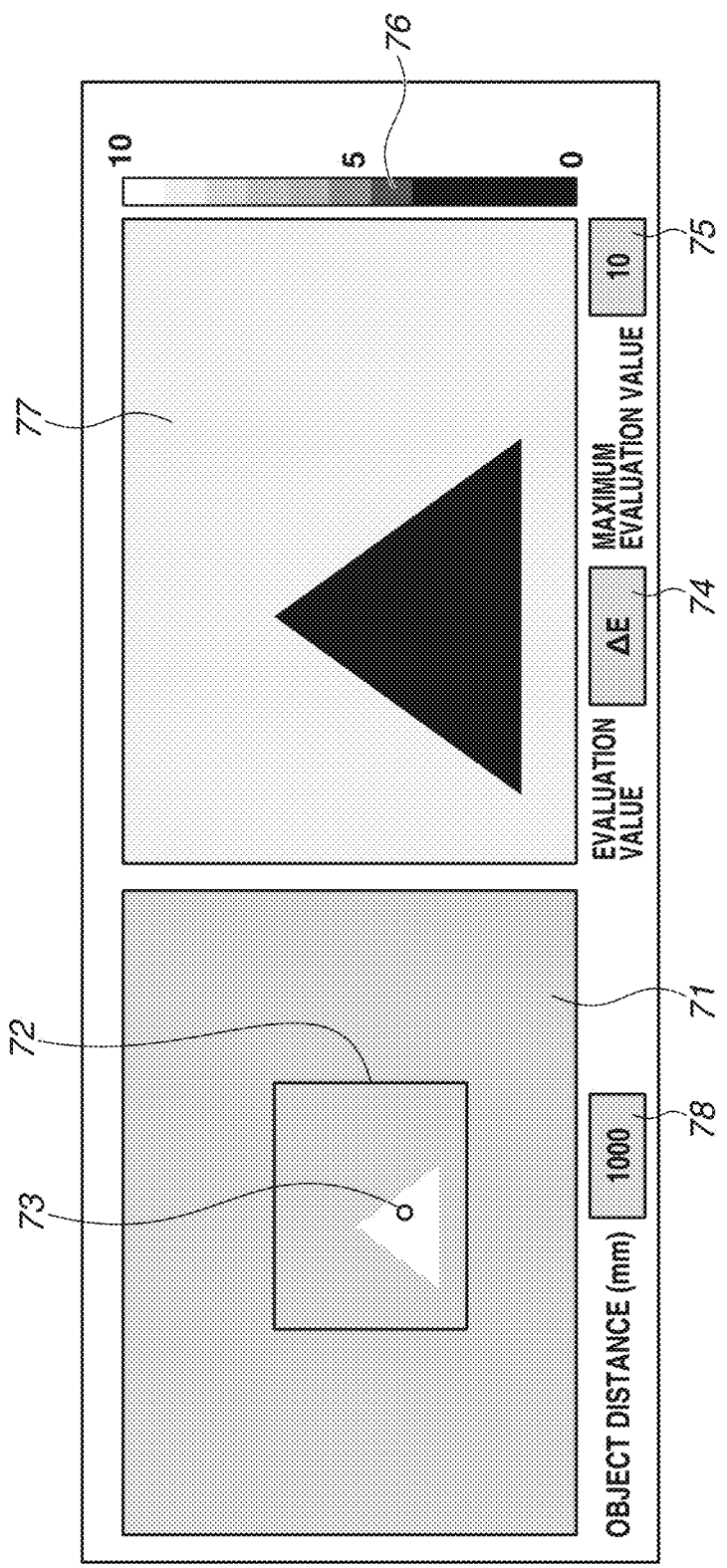
FIG. 7 is a diagram illustrating an example of a user interface (UI).

FIG. 7 illustrates an example of the UI of the display device 3. The UI includes a captured image 71, an evaluation area 72, a reference position 73, an evaluation value specification example 74, a maximum evaluation value 75, an evaluation scale 76, an evaluation image 77, and an object distance specification example 78.

The UI is displayed on the display device 3, and a user specifies the upper left and the lower right of an evaluation area using the input device 110 such as a mouse, and specifies the evaluation area 72.

For example, when the user desires to evaluate a color difference between a certain position and another position, the user specifies a point to be its reference (reference point 73). As to a specifying method, the input device 110 such as a mouse is used.

In the example of FIG. 7, the evaluation value 74 indicates ΔE, but can indicate Δa, Δb, ΔC, or ΔH.

As the maximum evaluation value 75, a maximum evaluation value for displaying the evaluation image 77 is specified.

The evaluation scale 76 expresses colors of the maximum evaluation value 75 to a minimum value (=0), such as white (R, G, B)=(255, 255, 255) to black (R, G, B)=(0, 0, 0).

The evaluation image 77 is generated by a method to be described below, and displayed.

<Process in Step S5>

Figure 8:
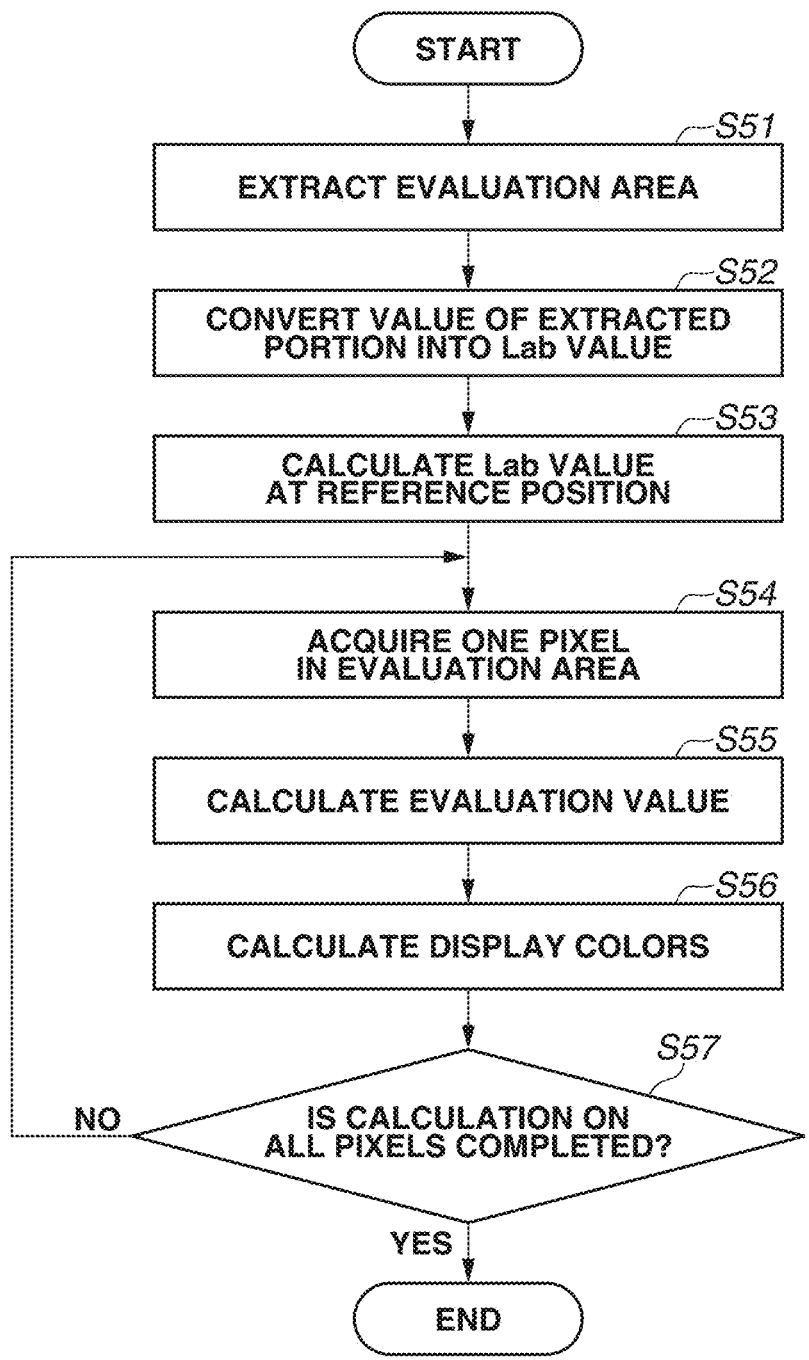
FIG. 8 is a flowchart illustrating a process for generating evaluation image data.

FIG. 8 is a flowchart illustrating an evaluation image data generating process to be executed by the evaluation image generation unit 15.

In step S51, the evaluation image generation unit 15 extracts the evaluation area specified on the blur image.

In step S52, the evaluation image generation unit 15 converts a value of the extracted portion of the blur image into a Lab value. In a case where an original image is an RGB image, the evaluation image generation unit 15 converts the value of the extracted portion into a CIELAB value in accordance with a formula defined by CIE RGB.

In step S53, the evaluation image generation unit 15 calculates a Lab value (L1, a1, b1) at the reference position. The Lab values of a pixel corresponding to the reference position specified in step S4 is L1, a1, b1.

In step S54, the evaluation image generation unit 15 acquires one pixel from the extracted image.

In step S55, the evaluation image generation unit 15 calculates an evaluation value. For example, when the evaluation value (color difference) is ΔE and the obtained Lab value of the pixel is (L2, a2, b2), the evaluation value ΔE is calculated by the following equation:

$$\Delta E = \sqrt{(L1-L_2)^2 + (a1-a_2)^2 + (b1-b_2)^2} \quad (4)$$

In step S56, the evaluation image generation unit 15 calculates a display color. In the calculation, for example, in a case where the maximum evaluation value 75 is 10, (R, G, B)=(255, 255, 255) when ΔE≥10 in the calculation, (R, G, B)=(0, 0, 0) when ΔE=0, and a linear value is obtained when 0<ΔE<10.

In step S57, the evaluation image generation unit 15 determines whether the calculation for all the pixels is completed. In a case where the calculation is completed (YES in step S57), the process ends. In a case where the calculation is not completed (NO in step S57), the process returns to step S54, and, the evaluation image generation unit 15 acquires one pixel for next target to be processed.

<Effect>

As described above, the image processing apparatus according to the present exemplary embodiment controls resolution based on human sense of sight, and thus can evaluate colors close to colors recognized by human beings.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include one or more memories, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-139580, filed Jul. 25, 2018, which is hereby incorporated by reference herein in its entirety.

What is claimed is:

1. An image processing apparatus comprising:
   one or more processors; and
   one or more memories storing instructions, when executed by the one or more processors, causing the image processing apparatus to function as:
   an acquisition unit configured to acquire a captured image obtained by imaging an imaging target using a camera;
   a generation unit configured to generate a display image to be displayed on a display unit, based on the captured image;
   a control unit configured to cause the display unit to display the display image;
   a specification unit configured to specify an evaluation area on the display image based on an instruction from a user; and
   a calculation unit configured to calculate an evaluation value in the evaluation area on the display image,
   wherein the generation unit generates a low-pass filter based on information representing a distance from the camera to the imaging target, information representing characteristics of a sensor of the camera, information representing optical characteristics of the camera, and information representing a human visual contrast response, and generates, as the display image, a result of executing a filter process on the captured image using the generated low-pass filter.

2. The image processing apparatus according to claim 1, wherein the filter process is executed using a low-pass filter.

3. The image processing apparatus according to claim 1, wherein the calculation unit sets a reference position in the evaluation area, and calculates the evaluation value representing a color difference between pixels included in the evaluation area and a pixel at the reference position.

4. The image processing apparatus according to claim 1, wherein the generation unit executes the filter process on the captured image based on information representing a distance from the camera to the imaging target.

5. The image processing apparatus according to claim 4, wherein the information representing the characteristics of the sensor of the camera is information representing a size and a pixel count of the sensor of the camera.

6. The image processing apparatus according to claim 1, wherein the generation unit executes the filter process based on information representing optical characteristics of the camera.

7. The image processing apparatus according to claim 6, wherein the information representing the optical characteristics of the camera is information representing a focal length of a lens of the camera.

8. The image processing apparatus according to claim 1, wherein the generation unit executes the filter process on the captured image based on information representing a human visual contrast response.

9. The image processing apparatus according to claim 1, wherein the generation unit executes the filter process on the captured image based on information representing a distance from the camera to the imaging target, information representing characteristics of a sensor of the camera, information representing optical characteristics of the camera, and information representing a human visual contrast response.

10. The image processing apparatus according to claim 1, wherein the generation unit calculates a pixel count for making human sensitivity highest, based on information representing a distance from the camera to the imaging target, information representing characteristics of a sensor of the camera, information representing optical characteristics of the camera, and information representing a human visual contrast response, generates a low-pass filter based on the calculated pixel count, and executes the filter process on the captured image using the generated low-pass filter.

11. The image processing apparatus according to claim 10, wherein the generation unit applies the calculated pixel count to a size of the low-pass filter.

12. The image processing apparatus according to claim 10, wherein the generation unit calculates what pixel count of the captured image corresponds to one cycle of a wave of 5 cyc/deg.

13. The image processing apparatus according to claim 12, wherein the generation unit calculates an imaging range on an imaging target surface using a size and a pixel count of an imaging sensor, the size and the pixel count being included in the information representing the characteristics of the sensor of the camera, and the distance from the camera to the imaging target.

14. The image processing apparatus according to claim 13, wherein the generation unit calculates a size corresponding to one degree using the distance from the camera to the imaging target.

15. The image processing apparatus according to claim 14, wherein the generation unit calculates the pixel count corresponding to the wave of one cycle using the pixel count of the imaging sensor, the imaging range, and the size corresponding to one degree.

16. The image processing apparatus according to claim 15, wherein the generation unit generates a low-pass filter based on the pixel count corresponding to the wave of one cycle, and executes the filter process on the captured image using the generated low-pass filter.

17. The image processing apparatus according to claim 1, wherein the calculation unit calculates the evaluation value using the display image.

18. An image processing method comprising:
   acquiring a captured image obtained by imaging an imaging target using a camera;
   generating a display image to be displayed on a display unit by executing a filter process on the captured image;
   causing the display unit to display the display image;
   specifying an evaluation area on the display image based on an instruction from a user; and
   calculating an evaluation value in the evaluation area on the display image,
   wherein a low-pass filter is generated based on information representing a distance from the camera to the imaging target, information representing characteristics of a sensor of the camera, information representing optical characteristics of the camera, and information representing a human visual contrast response, and a result of executing the filter process on the captured image using the generated low-pass filter as the display image.

19. A non-transitory computer-readable storage medium storing instructions that, when executed by a computer, cause the computer to perform a method comprising:
   acquiring a captured image obtained by imaging an imaging target using a camera;
   generating a display image to be displayed on a display unit by executing a filter process on the captured image;
   causing the display unit to display the display image;
   specifying an evaluation area on the display image based on an instruction from a user; and
   calculating an evaluation value in the evaluation area on the display image,
   wherein a low-pass filter is generated based on information representing a distance from the camera to the imaging target, information representing characteristics of a sensor of the camera, information representing optical characteristics of the camera, and information representing a human visual contrast response, and a result of executing the filter process on the captured image using the generated low-pass filter as the display image.

* * * * *